US011249939B2

(12) United States Patent
Pechanek

(10) Patent No.: US 11,249,939 B2
(45) Date of Patent: Feb. 15, 2022

(54) METHODS AND APPARATUS FOR SHARING NODES IN A NETWORK WITH CONNECTIONS BASED ON 1 TO K+1 ADJACENCY USED IN AN EXECUTION ARRAY MEMORY ARRAY (XARMA) PROCESSOR

(71) Applicant: Gerald George Pechanek, Cary, NC (US)

(72) Inventor: Gerald George Pechanek, Cary, NC (US)

( * ) Notice: Subject to any disclaimer, the term of this patent is extended or adjusted under 35 U.S.C. 154(b) by 80 days.

(21) Appl. No.: 16/781,428

(22) Filed: Feb. 4, 2020

(65) Prior Publication Data
US 2020/0250131 A1 Aug. 6, 2020

Related U.S. Application Data

(60) Provisional application No. 62/801,315, filed on Feb. 5, 2019.

(51) Int. Cl.
*G06F 9/30* (2018.01)
*G06F 15/80* (2006.01)
*G06F 15/173* (2006.01)

(52) U.S. Cl.
CPC ........ *G06F 15/8023* (2013.01); *G06F 9/3001* (2013.01); *G06F 9/30043* (2013.01); *G06F 9/30145* (2013.01); *G06F 15/17393* (2013.01)

(58) Field of Classification Search
CPC ... G06F 3/00; G06F 5/00; G06F 12/00; G06F 13/00
See application file for complete search history.

(56) References Cited

U.S. PATENT DOCUMENTS

| | | | |
|---|---|---|---|
| 2016/0085721 A1* | 3/2016 | Abali | G06K 9/00973 712/15 |
| 2020/0174787 A1* | 6/2020 | Yadavalli | G06F 17/16 |

\* cited by examiner

*Primary Examiner* — Scott C Sun

(57) ABSTRACT

An Execution Array Memory Array (XarMa©) processor is described for signal processing and internet of things (IoT) applications, (pronounced sharma, that means happiness in Sanskrit). The XarMa© processor uses a 1 to K+1 adjacency network in an array of execution units. The 1 to K+1 adjacency refers to connections separately made in rows and in columns of execution unit and local file nodes, where the number of $R_{ows} \geq K>1$ and of $C_{olumns} \geq K>1$ and K is an odd integer. Instead of a large central multi-ported register file, a distributed set of storage files local to each execution unit is used. The instruction set architecture uses instructions that specify forwarding of execution results to execution units associated with destination instructions. This execution array is scalable to support cost effective and low power high-performance application specific processing focused on target product requirements.

20 Claims, 5 Drawing Sheets

US 11,249,939 B2

METHODS AND APPARATUS FOR SHARING NODES IN A NETWORK WITH CONNECTIONS BASED ON 1 TO K+1 ADJACENCY USED IN AN EXECUTION ARRAY MEMORY ARRAY (XARMA) PROCESSOR

RELATED APPLICATION DATA

The present application claims the benefit of U.S. Provisional Application No. 62/801,315 filed Feb. 5, 2019 entitled "Methods and Apparatus for Sharing Execution Units In an Execution Unit Network With Connections Based on 1 to K+1 Adjacency" which is incorporated by reference herein in its entirety.

FIELD OF INVENTION

The present invention relates to unique and improved methods and apparatuses for processing architectures and organizations of processing elements in networks configured to reduce power. More specifically, this invention concerns processing architectures and interconnection networks, based on 1 to K+1 adjacency, that reduce power for communicating between nodes, including execution units and local files, as controlled by a result forwarding instruction set architecture.

CROSS REFERENCE TO RELATED APPLICATIONS

The U.S. Pat. Nos. 7,581,079, 7,886,128, 8,156,311, 8,443,169, 9,460,048, 9,507,603, 10,078,517, and 10,503,515 have the same inventor, are related patents, and are hereby incorporated by reference in their entirety.

BACKGROUND OF INVENTION

A driving factor in development of internet of things (IoT) products, including phones, watches, medical related sensor devices, etc., is low cost, low power, high performance, and scalability. Significant performance and power problems in current multi-processor architectures involve accessing data from memory, operating on the accessed data, and sharing of data between processors. These multi-processor architectures are generally based on use of large central multi-ported register files. Also, having adequate memory bandwidth to support high performance operations is related to the organization of the processors, memory modules, execution unit connections and the interconnection network used for load and store operations.

One of the problems associated with increasing performance in multiprocessor parallel processing systems is the efficient accessing of data or instructions from memory. Having adequate memory bandwidth for sharing of data between processors is another problem associated with parallel processing systems. These problems are related to the organization of the processors and memory modules and the processor architecture used for data communication between a processor, including execution units, and a plurality of memories and between processors. Various approaches to solving these problems have been attempted in the past, for example, array processors and shared memory processors.

Multiprocessor systems can be classified generally in terms of coupling strength for communication between processors. Those multiprocessor systems that communicate using a share memory facility between the processors and the shared memory over an interconnection network are generally considered tightly coupled. Loosely coupled multiprocessor systems generally use an input/output (I/O) communication process in each processor for communicating between the processors over an interconnection network, such as message passing process. A wide variety of interconnection networks have been utilized in multiprocessing systems. For example, rings, bus connected, crossbar, tree, shuffle, omega, and butterfly, mesh, hypercube, and ManArray networks, have been used in prior multiprocessor systems. From an application or use perspective, specific networks have been chosen primarily based upon performance characteristics and cost to implement tradeoffs.

Parallel processing and the distribution of data between functional execution elements may be described using Kronecker product expressions of signal transform functions, such as the fast Fourier transform (FFT) and other signal flow graph expressions. However, the underlying processor architecture may present limitations that affect the efficiency of implementing functions described using Kronecker product expressions and other signal analysis techniques.

SUMMARY OF THE INVENTION

It is appreciated that improvements to processor architecture, network design, and organizations of processors and memory are desired. Such improvements are provided by multiple embodiments of the present invention.

An embodiment of the present invention addresses a method of executing a sequence of instructions in an execution unit (ExU) node in an array of ExUnits. A first instruction and a destination instruction having a dependency on the first instruction are received, wherein the first instruction identifies the destination instruction in a sequence of instructions from a program and specifies that a result generated by execution of the first instruction by a first ExU node is to be forwarded to a destination ExU node that is to execute the destination instruction. The first instruction is executed on the first $ExU_{r,c}$ node to generate the result for delivery through an ExU network to the destination ExU node associated with the identified destination instruction, wherein according to a Row by Column (R×C) matrix, an R×C array of $ExU_{row(r),column(c)}$ nodes are interconnected by the ExU network, the ExU network comprising (K+1) by (K+1) array of $ExU_{r,c}$ nodes, a first stage (K+1)×(K+1) array of $R_{r,c}$ nodes for a first direction of communication, a second stage (K+1)×(K+1) array of $S_{r,c}$ nodes for a second direction of communication, and in each stage having wiring configured according to a 1 to K+1 adjacency of connections between nodes which includes wrapping around data paths at the edges of the (K+1)×(K+1) arrays, K is an odd integer, K>1, R≥(K+1), C≥(K+1), r∈{0, 1, . . . , K}, and c∈{0, 1, . . . , K}, and wherein connections exist between each $ExU_{r,c}$ node and $R_{r,c}$ nodes with the same row number in the first direction of communication, the first $ExU_{r,c}$ node generates the result for a selectable first data path that connects to an $R_{r,c+1}$ node and for a selectable second data path that connects to an $R_{r,c-1}$ node for single step adjacency and for a selectable third data path that connects to an $R_{r,c+2}$ node for two step adjacency, and for a selectable fourth data path that connects to an $R_{r,c}$ node in the same r,c position in the R×C matrix as the connecting $ExU_{r,c}$ node, and wherein connections exist between each $R_{r,c}$ node and $S_{r,c}$ nodes with the same column number in the second direction of communication, wherein an $R_{r,c}$ node, associated with a selected path in the first direction of communication, produces the result for a selectable first data path that connects to an $S_{r+1,c}$ node and for a second data path that connects to an $S_{r-1,c}$ node for single step adjacency and for a third data path that connects to an $S_{r+2,c}$ node for two step adjacency, and for a fourth data path that connects to an $S_{r,c}$ node in the same r,c position in the R×C matrix as the connecting $R_{r,c}$ node, wherein an $S_{r,c}$ node, associated with the selected data path in the second direction of communication, produces the result on a destination data path that connects to the destination E×U node to be received at the destination E×U node. The destination instruction is executed in the destination E×U node based on the received result to produce a destination result for use by the program.

Another embodiment of the invention addresses a network organized according to a 1 by Column (1×C) matrix. A 1×C array of $ExU_{1,column(c)}$ nodes are interconnected by an E×U network, the E×U network comprising 1 by (K+1) array of $ExU_{1,c}$ nodes connected to a 1×(K+1) array of $R_{1,c}$ nodes for a first direction of communication, and having wiring configured according to a 1 to K+1 adjacency of connections between the $ExU_{1,c}$ nodes and the $R_{1,c}$ nodes which includes wrapping around data paths at the edges of the 1×(K+1) arrays, K is an odd integer, K>1, C≥(K+1), and c∈{0, 1, . . . , K} and wherein connections exist between each $ExU_{1,c}$ node and $R_{1,c}$ nodes in the first direction of communication, a first $ExU_{1,c}$ node is connected by a first data path to an $R_{1,c+1}$ node and by a second data path to an $R_{1,c-1}$ node for single step adjacency and by a third data path to an $R_{1,c+2}$ node for two step adjacency, and by a fourth data path to an $R_{1,c}$ node in the same 1,c position in the 1×C matrix as the first $ExU_{1,c}$ node, wherein the $R_{1,c-1}$ node is connected by a first outputA path to its associated $ExU_{1,c-1}$ node, the $R_{1,c}$ node is connected by a second outputA path to its associated $ExU_{1,c}$ node, the $R_{1,c+1}$ node is connected by a third outputA path to its associated $ExU_{1,c+1}$ node, and the $R_{1,c+2}$ node is connected by a fourth outputA path to its associated $ExU_{1,c+2}$ node.

A further embodiment of the invention a system is provided. The system has a load unit having a source of data values external to an array of execution unit (E×U) nodes that are interconnected by an E×U network. A first multiplexing element in the load unit to connect externally received data values to an E×U located in the E×U network for processing by one or more program instructions. The system has a store unit having a source of data values internal to the array of E×U nodes. A second multiplexing element in the store unit to connect to the E×U network to receive data values from an E×U source and connect the internally received data values to a destination node located external to the E×U network for processing by the destination node, wherein the load unit is combined with the store unit as a single node of the array of E×U nodes.

These and other features, aspects, techniques and advantages of the invention will be apparent to those skilled in the art from the following detailed description, taken together with the accompanying drawings and claims.

DETAILED DESCRIPTION

While the present invention is disclosed in a presently preferred context, it will be recognized that the teachings of the present invention may be variously embodied consistent with the disclosure and claims. It will be recognized that the present teachings may be adapted to other present and future architectures to which they may be beneficial.

In order to amortize development costs for such devices across multiple products targeted for different applications, a scalable architecture with multiple design points using the same instruction set architecture is proposed. To address low power, high performance, and scalability, a new architecture is presented that reduces storage of temporary variables lowering power usage, provide efficient processor and shared memory transfers, and is scalable.

Figure 1:
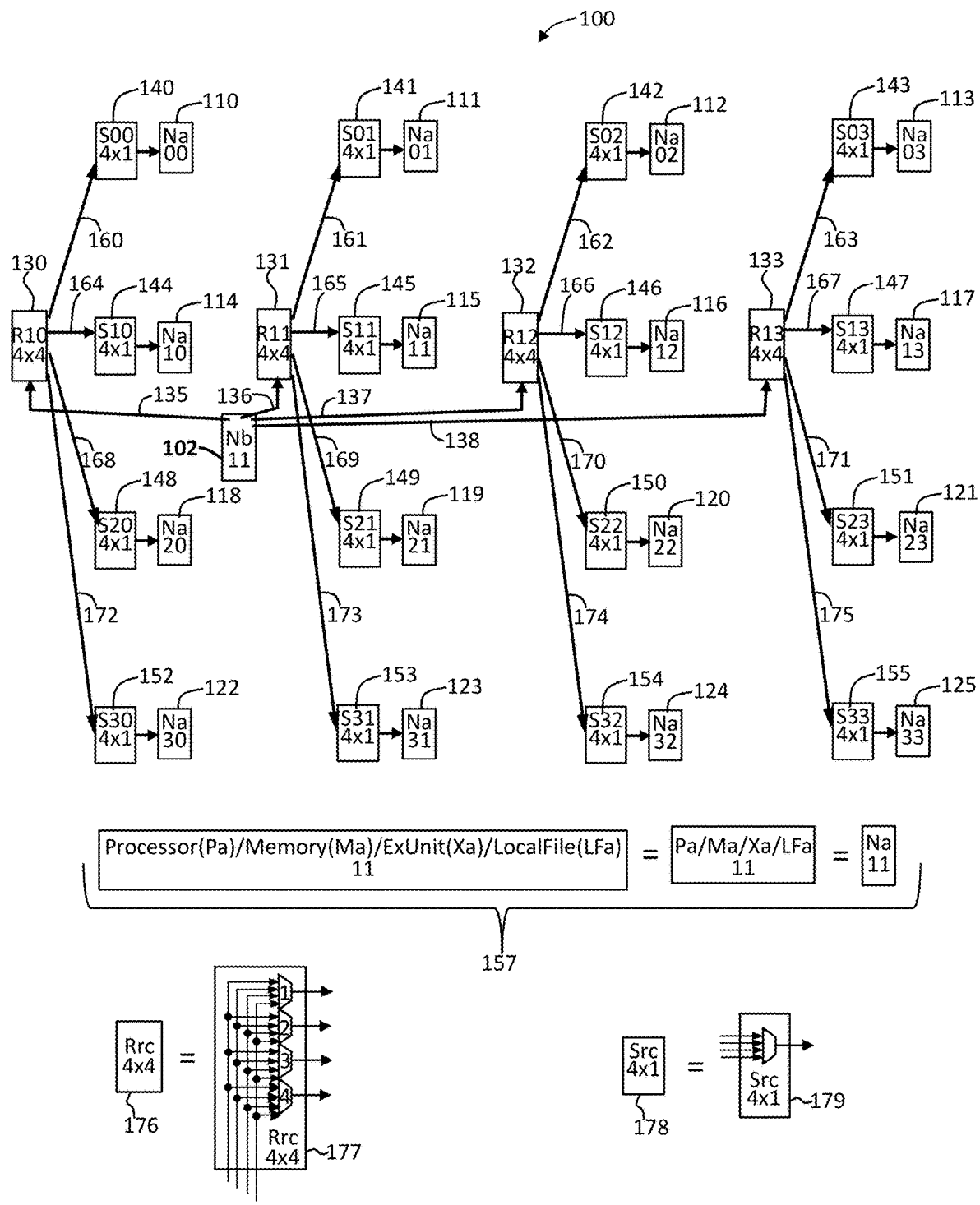
FIG. 1 illustrates exemplary specifiable paths in an array beginning from a source node to nodes in a $K+1_{row}$ by $K+1_{column}$ array of nodes interconnected by a K+1 adjacency network, wherein K is an odd integer >1, in accordance with an embodiment of the present invention.
Figure 2:
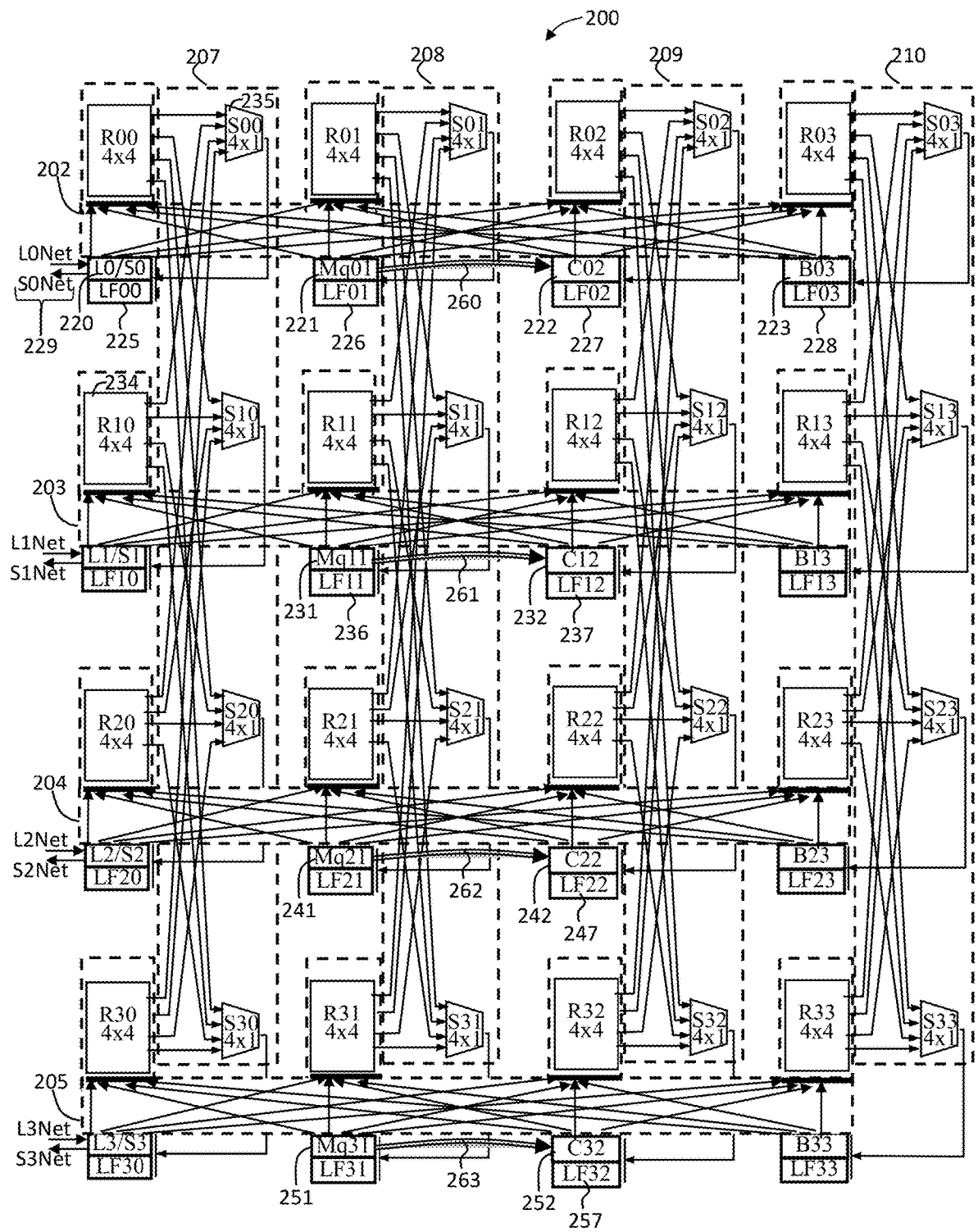
FIG. 2 illustrates an execution array organized in an exemplary 4 row by 4 column arrangement of execution units and local files in a physical layout form with a one to K+1 level adjacency, where K is a positive odd integer, in accordance with an embodiment of the present invention.

FIG. 1 illustrates exemplary specifiable paths in an array 100 from a single node (Nb11) 102 to nodes in a $K+1_{row}$ by $K+1_{column}$ array of nodes Na00 110 to Na33 125 interconnected by a K+1 adjacency network, wherein K is an odd integer >1, in accordance with an embodiment of the present invention. Array notation is used with nodes, such as $Na00=Na_{row}=0_{column}=0$. The Na00-Na33 nodes 110-125, such as Na11 115, also shown in exemplary node illustration 157, may be processor nodes (Pa), or memory nodes (Ma), or execution unit nodes (Xa), or local file nodes (LFa). The single Nb11 node 102 is one of a 4×4 array of nodes Nb00 to Nb33, not shown for reason of clarity in the drawing. The Nb00-Nb33 nodes may also be processor nodes (Pb), or memory nodes (Mb), or execution unit nodes (Xb), or local file nodes (LFb). There is also a 4×4 array of $R_{r,c}$ 4×4 crossbar nodes of which nodes R10 130, R11 131, R12 132, and R13 133 are shown. There is further shown a 4×4 array of $S_{r,c}$ 4×1 multiplexer nodes including S00 4×1 140 to S33 4×1 155 nodes. FIG. 2 shows all the nodes together. An exemplary $R_{r,c}$ node 176 is configured with four 4 to 1 multiplexers (4×1) 177. An exemplary $S_{r,c}$ node 178 is configured with one 4 to 1 multiplexer (4×1) 179. The horizontal row data buses 135-138 and vertical column data buses 160-175 are Bb-bits, for example Bb=16-bits or 32-bits or 64-bits, and the like. Generally, the bus paths for $Nb_{r,c} \rightarrow R_{r,c}$, $R_{r,c} \rightarrow S_{r,c}$, and $S_{r,c} \rightarrow (Pa/Ma/Xa/LFa)_{r,c}$, having the same r and the same c, are prioritized for short layouts, such as the case where $Nb_{r,c}$ is a processor and the $S_{r,c}$ node connects to a memory node $Ma_{r,c}$.

To illustrate an exemplary data path, the node Nb11 102 is designed to be an execution unit, so is referenced here in this description as Xb11. The execution unit Xb11 102 generates a result upon executing an instruction which is programmatically directed to use one or more selectable data buses 135-138, such as the data bus 135. The data buses 135-138 comprise data buses 135 and 137 having connections between the Xb11 node 102 and the $R_{1,0}$ node 130 and the $R_{1,2}$ node 132 with the same row number in the first direction of communication of single step adjacency between next door adjacent neighbors. The first direction of communication of single step adjacency for the Xb11 node is communication in the east and west horizontal direction. The single step adjacency for Xb11 is to R nodes having an integer column number of the starting node, in this case column 1 for the Xb11 node 102, increased by a value of "1" for single step adjacency in the east direction to $R_{1,2}$ node 132 and decreased by the value "1" for single step adjacency in the west direction to $R_{1,0}$ node 130. Wraparound is also in effect, in this case, after the increase of a starting column number 3 by "1" for a value of K+1=4, the starting column number 3 wraps around to column "0" and after the decrease of a starting column number 0 by "1" for a value of "−1", the starting column number 0 wraps around to column "3".

The data bus 136 has a connection between Xb11 node and $R_{1,1}$ node 131 having the same position in the R×C matrix. The data bus 138 has a connection between Xb11 node 102 and the $R_{1,3}$ node 133 representing one additional connection in the first direction of communication of two step adjacency. The one additional connection in the first direction of communication of two step adjacency for the Xb11 node 102 may be communication in either the east direction or communication in the west horizontal direction. The east direction of communication of two step adjacency for the Xb11 node 102 is to an R node having an integer column number of the starting node, in this case column 1 for the Xb11 node 102, increased by a value of "2" in the east direction to $R_{1,3}$ node 133. With wrap around, an increased column number of 4 wraps around to column 0 and an increased column number of 5 wraps around to column 1. The west direction of communication of two step adjacency for the Xb11 node 102 is to an R node having an integer column number of 1 for the starting node Xb11 node 102, is decreased by a value of "2" in the west direction to a −1 value and is directed to $R_{1,3}$ node 133 due to wraparound. With wrap around, a decreased column number of −2 wraps around to column 2.

The data travels across the data bus 135 and reaches node R10 130 which is configured with four 4to1 multiplexers, such as shown $R_{r,c}$ 4×4 crossbar node 177. Each of the four 4to1 multiplexers receives control signals that cause each multiplexer to select none or one of that multiplexer's four input signals to pass to its associated output of the R10 130 4×4 crossbar. There are three types of $R_{r,c}$ node to $S_{r,c}$ node connection paths. The first type of connection path is for data buses 160 and 168 having connections between the $R_{1,0}$ node 130 and the $S_{0,0}$ node 140 and the $S_{2,0}$ node 148 with the same column number in a vertical second direction of communication of single step adjacency between next door adjacent neighbors. The second type of connection path is for data bus 164 which has a connection between $R_{1,0}$ node 130 and $S_{1,0}$ node 144 having the same position in the R×C matrix. The third type of connection path is for data bus 172 which has a connection between the $R_{1,0}$ node 130 and the $S_{3,0}$ node 152 representing one additional connection in the second direction of communication of two step adjacency. The first direction of communication and the second direction of communication can be reversed, with the first direction of communication being in a vertical North/South direction and the second direction of communication being is a horizontal East/West direction.

FIG. 2 illustrates an execution array 200 organized in an exemplary 4 row by 4 column arrangement of execution units and local files in a physical layout form with a one to K+1 level adjacency, where K is a positive odd integer, in accordance with an embodiment of the present invention. In FIG. 2, functional units and local storage units are separately coupled across each row with the same row number in a first direction of communication of single step adjacency between next door adjacent neighbors by horizontal row networks 202-205 to $R_{r,c}$ nodes. The $R_{r,c}$ nodes are separately coupled across each column with the same column number in a second direction of communication of single step adjacency between next door adjacent neighbors by vertical column networks 207-210 to $S_{r,c}$ nodes and from there to the functional units and local storage units. For example, in row 0 202 there are a plurality of functional units comprising a load0 (L0)/store0 (S0) unit 220, a multiplication M01 unit 221, an ALU Complex (C) unit 222, and a ALU Bit operation (B) unit 223. Also in row 0 202 and associated with the plurality of functional units are local file (LF) storage units comprising LF00 225, LF01 226, LF02 227, and LF03 228. The other three rows 1-3 203-205 contain a similar organization of functional units and local file units labeled according to their position in the R×C array, such as multiplication Mq11 unit 231 and LF11 236. The local files in each row provide a distributed register file for storage of variables as required by a program. Each local file is placed local to its associated functional unit by nature of the timing path to read from and write to the local file as required by a particular implementation. Each local file may also be considered a sub-file portion of a distributed register file supporting computations in row. The 4×4 execution unit/LF network connecting the functional units and local LFs according to a 1toK+1 adjacency as defined herein contains paths such as shown in FIG. 1.

In FIG. 2, the four buses 260-263 are provided to transport four 32-bit results generated in each multiplier (Mqxx) unit 221, 231, 241, and 251 over to an associated add and subtract function in the ALU Complex (C) unit 222, 232, 242, and 252 as part of a complex multiplication operation. The four buses 260-263 are able to operate in parallel with the horizontal row networks 202-205 to $R_{r,c}$ nodes and the vertical column networks 207-210 to $S_{r,c}$ nodes and from there to the functional units and local storage units of E×U network operations. Results of the complex multiplication generated in C02 222, C12 232, C22 242, and C32 252 may be stored locally in associated LF02 227, LF12 237, LF22 247, and LF32 257, respectively.

Figure 3:
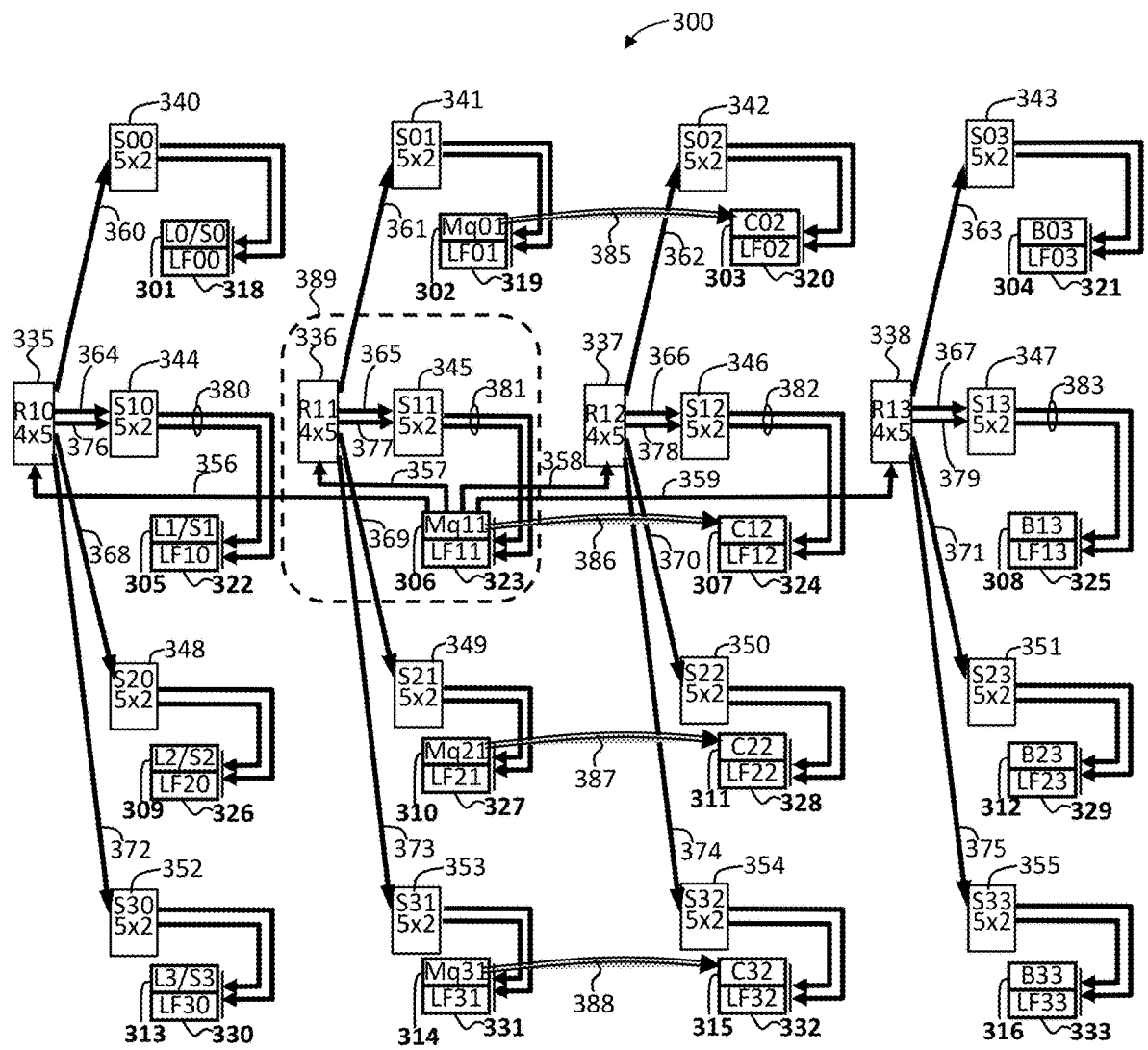
FIG. 3 illustrates exemplary specifiable paths in a 4×4 array of nodes beginning from a source node to nodes in a $K+1_{row}$ by $K+1_{column}$ array of nodes interconnected by a K+1 adjacency network with an increased number of inter-node data paths, wherein K is an odd integer >1, in accordance with an embodiment of the present invention.

FIG. 3 illustrates exemplary specifiable paths in a 4×4 array of nodes 300 beginning from a source node, Mq11 306 or LF11 323, to nodes in a $K+1_{row}$ by $K+1_{column}$ array of nodes (L0/S0)/LF00 301/318 to B33/LF33 316/333 interconnected by a K+1 adjacency network with an increased number of internode data paths, wherein K is an odd integer >1, in accordance with an embodiment of the present invention. Array notation is used with nodes, such as (L0/S0)/LF00=$LF_{row=0\,column=0}$=0 301/318. The (L0/S0)/LF00 301/318-B33/LF33 316/333 nodes may be different types of execution unit nodes, such as a load and store unit loadx (Lx)/storex(Sx) or a multiply complex unit (Mqxx) or an ALU Complex (Cxx) unit or an ALU Bit operation (Bxx) unit located with their corresponding local file nodes (LFxx). A row 1 of nodes L1/S1/LF10 305/322, Mq11/LF11 306/323, C12/LF12 307/324, and B13/LF13 308/325 is an exemplary row of nodes in the 4×4 array of nodes 300. Wiring according to the 1 to K+1 adjacency where K=3 is only shown for the Mq11 306 and LF11 323 nodes for reason of clarity in the drawing. In order to support two operand data paths, cells are defined, wherein each cell comprises an execution node, a local file node, an R node, and an S node for the same row column position, such as exemplary cell 389 comprising Mq11/LF11 306/323, R11 336, S11 345. The cells are configured with expanded capabilities in the R and S nodes. The R nodes, such as R11 336 and shown in Rrc 4×5 390 and in more detail in Rrc 4×5 391 comprises an additional 4to1 multiplexer 392. There is also a 4×4 array of $R_{r,c}$ 4×5 crossbar nodes of which nodes R10 335, R11 336, R12 337, and R13 338 are shown. There is further shown a 4×4 array of $S_{r,c}$ 5×2 multiplexer nodes including S00 340 to S33 355 nodes. Each $R_{r,c}$ node, such as $R_{r,c}$ 390, is configured with five 4 to 1 multiplexers as shown in $R_{r,c}$ 391. Each $S_{r,c}$ node, such as $S_{r,c}$ 393 is configured with two 5 to 1 multiplexers as shown in $S_{r,c}$ 5×2 394. The horizontal row data buses 356-359 and vertical column data buses 360-379 are Bb-bits, for example Bb=16-bits or 32-bits or 64-bits, and the like. Generally, the data bus paths within cells, such as exemplary cell 389, include paths, such as from Mq11/LF11 306/323 over bus 357 to R11 336, R11 336 over a first data bus path 365 and a second data bus path 377 to S11 345, and S11 345 over two data bus paths 381 to Mq11/LF11 306/323, are prioritized for short layouts.

To illustrate an exemplary data path, the execution unit Mq11 306 generates a result upon executing an instruction which is programmatically directed to use one or more data buses 356-359, such as the data bus 356. The data buses 356-359 comprise data buses 356 and 358 having connections between the Mq11 306 and the $R_{1,0}$ node 335 and the $R_{1,2}$ node 337 with the same row number in the first direction of communication of single step adjacency between next door adjacent neighbors. The first direction of communication of single step adjacency for the Mq11 306 node is communication in the east and west horizontal direction. The single step adjacency for Mq11 306 is to R nodes having an integer column number of the starting node, in this case column 1 for the Mq11 306, increased by a value of "1" for single step adjacency in the east direction to $R_{1,2}$ node 337 and decreased by the value "1" for single step adjacency in the west direction to $R_{1,0}$ node 335. Wraparound is also in effect, in this case, after the increase of a starting column number 3 by "1" for a value of K+1=4, the starting column number 3 wraps around to column "0" and after the decrease of a starting column number 0 by "1" for a value of "−1", the starting column number 0 wraps around to column "3".

The data bus 357 has a connection between Mq11 306 and $R_{1,1}$ node 336 having the same position in the R×C matrix. The data bus 359 has a connection between Mq11 306 and the $R_{1,3}$ node 338 representing one additional connection in the first direction of communication of two step adjacency. The one additional connection in the first direction of communication of two step adjacency for the Mq11 306 node is communication in either the east direction or communication in the west horizontal direction. The east direction of communication of two step adjacency for Mq11 306 is to an R node having an integer column number of the starting node, in this case column 1 for the Mq11 306, increased by a value of "2" in the east direction to $R_{1,3}$ node 338. With wrap around, an increased column number of 4 wraps around to column 0 and an increased column number of 5 wraps around to column 1. The west direction of communication of two step adjacency for Mq11 306 is to an R node having an integer column number of 1 for the starting node Mq11 306, is decreased by a value of "2" in the west direction to a −1 value and is directed to $R_{1,3}$ node 338 due to wraparound. With wrap around, a decreased column number of −2 wraps around to column 2.

The data travels across the data bus 356 and reaches node R10 335 which is configured with five 4to1 multiplexers, such as shown $R_{r,c}$ 4×5 crossbar node 391. Each of the five 4to1 multiplexers receives control signals that cause each multiplexer to select none or one of that multiplexer's four input signals to pass to its associated output of the R10 335 4×5 crossbar. There are three types of $R_{r,c}$ node to $S_{r,c}$ node connection paths. The first type of connection path is for data buses 360 and 368 having connections between the $R_{1,0}$ node 335 and the $S_{0,0}$ node 340 and the $S_{2,0}$ node 348 with the same column number in a second vertical direction of communication of single step adjacency between next door adjacent neighbors. The second type of connection path is for data buses 364 and 376 which have a connection between $R_{1,0}$ node 335 and $S_{1,0}$ node 344 having the same position in the R×C matrix. The third type of connection path is for data bus 372 which has a connection between the $R_{1,0}$ node 335 and the $S_{3,0}$ node 352 representing one additional connection in the second direction of communication of two step adjacency. The first direction of communication and the second direction of communication can be reversed, with the first direction of communication being in a vertical North/South direction and the second direction of communication being is a horizontal East/West direction.

Figure 4:
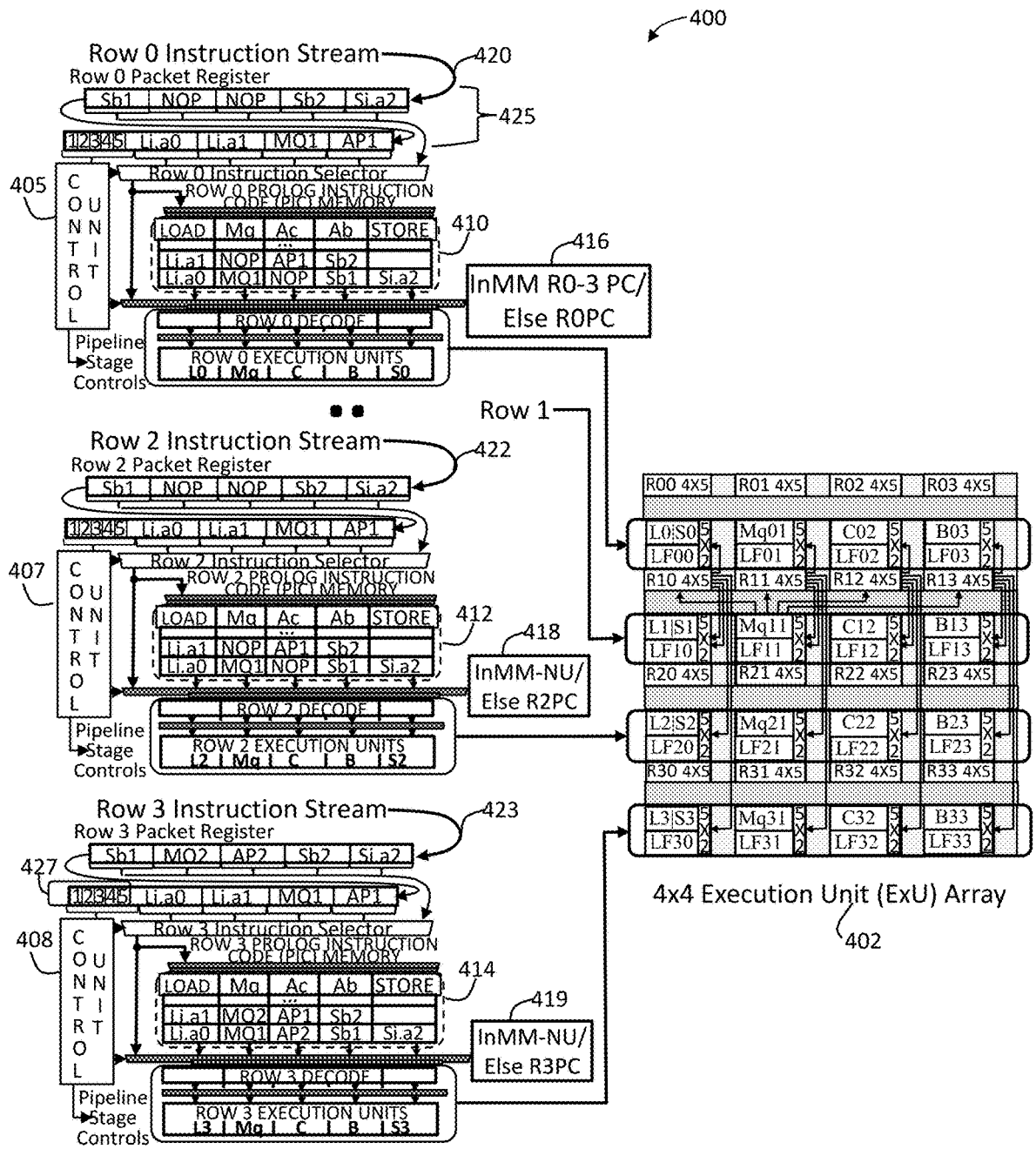
FIG. 4 illustrates a control system for a R=4×C=4 XarMa processor comprising row 0-3 control units with corresponding prolog instruction code (PIC) memories in accordance with an embodiment of the present invention.

FIG. 4 illustrates control system 400 for an R=4×C=4 XarMa processor comprising row 0-3 control units 405, 407, 408 with corresponding prolog instruction code (PIC) memories 410, 412, 414 in accordance with an embodiment of the present invention. FIG. 4 illustrates three of the four row pipeline control units that control pipeline stage operations in each row to execute chained execution packets (CEPs), for reasons of clarity of presentation. A CEP is a chain of instructions that generally contain sequential dependencies between one or more instructions in the chain. The CEPs may be fetched in packets or streamed 420, 422, 423 over to row packet registers, such as row 0 packet register 425. Upon receiving a chained execution packet (CEP) which contains control parameters in a header 427, shown as 12345, for a selected execution row, such as row 3, the control parameters are loaded into the control unit 408 for row 3 to coordinate operations on the processor. Instructions are selected from each row packet register for execution and as specified by the control unit and loaded into the associated prolog instruction control (PIC) memory. As shown, the PIC memories 410, 412, 414 load up the instructions during execution of a prolog code sequence and are accessible from the PIC memories for execution in combinations of instructions of up to five instructions at a time, in this example, for independent parallel decode and execution. The 4×4 execution unit (ExU) array 402 can operate all 16 execution units and 16 LFs under a single program counter control 416 in a master mode of operations or the rows of execution units can operate separately under control of four program counters, three of which 416, 418, and 419 are shown in FIG. 4. The program counters (PCs) operate under a program mode control that if in Master Mode (InMM), the Row 0 program counter (R0PC) is the PC for Rows0-3, else, the R0PC is used for R0 only and for rows 1-3 if InMM, the rows 1-3 PCs are not used (NU), else, the R1PC not shown for reasons of clarity of presentation, the R2PC 418 is used for R2 only and the R3PC 419 is used for R3 only.

Figure 5:
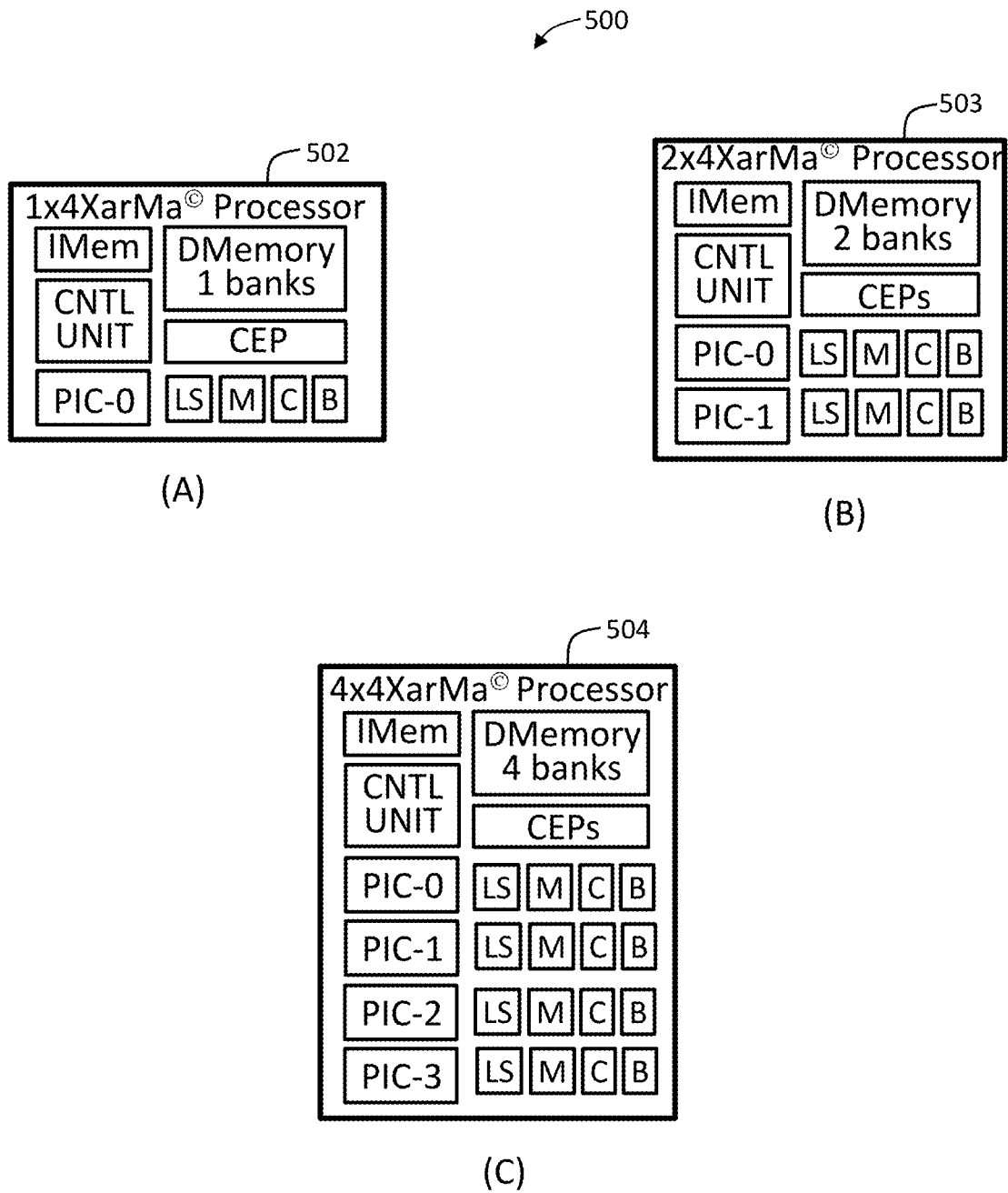
FIG. 5 illustrates three R×C XarMa processors that are based on the 4×4 Execution unit (E×U) array of FIGS. 1-4 in accordance with embodiments of the invention.

FIG. 5 illustrates three R×C XarMa processors 500 that are based on the 4×4 Execution unit (ExU) array of FIGS. 1-4 in accordance with embodiments of the invention. The XarMa processor can be scaled both smaller and larger as shown in FIGS. 5A-5C. FIG. 5A illustrates a 1×4 XarMa processor 502 having a single row of five types of execution units, one load unit (L), a multiply (M), such as the Mq units shown in FIGS. 2-4, an ALU complex (C) unit, an ALU bitop (B) unit, and a store unit (S). By developing an instruction set architecture that allows operands to be specified for delivery to a function unit's operand input instead of specifying a register in a register file, local files with a reduced capacity and reduced number of ports can be used instead of a large capacity multi-ported register file. A load unit (L1) and a store unit (S1) may be combined (LS) with a single two read port 2 write port (2R2W) LF allowing L1 to load directly to an S1 input register or the associated LF or by means of the execution unit network to one or more OIPRs in function execution units. Such a store unit and load unit combination may facilitate directly communicating between processor and memory nodes to reach further network attached elements. For example, the load unit that provides a data value to a function unit or to a local file write port may be located with the store unit that receives the data value from the load unit, a function unit, or from a local file read port. The load unit may access a source data value from a memory and load the fetched data to one or more function units or LFs. The store unit may receive a data value from a function unit or from a LF for storage to memory. FIG. 5B illustrates a 2×4 XarMa processor 503 having two rows of four types of execution units, LS, M, C, B per row. FIG. 5C illustrates a 4×4 XarMa processor 504 having four rows of four types of execution units, LS, M, C, B, per row. The data (D) memory banks and instruction memory are configured on a silicon plane separate from the processing logic and execution array plane. While this is a preferred approach, it does not preclude placing the data memory banks and instruction memory on the same silicon with the processing logic and execution array.

To minimize the storage of temporary variables, an instruction is formatted to specify that a result is to be forwarded to one or more destination instructions in a chain of execution instructions instead of a destination register in a central register file. The forwarding of the result to the destination instruction is decoded by internal logic to be an operand input port register (OIPR) of an associated execution unit thereby eliminating the storage of the temporary result variable in a central register file. For the 1×4 XarMa processor 502 of FIG. 5A no row specifier is required, but for the 2×4XarMa processor 503 of FIG. 5B and for the 4×4 XarMa processor 504 of FIG. 5C or for other configurations such as a 5×4 or 5×5 XarMa processor, a row specifier is used in identifying the appropriate execution unit associated with destination instructions. If there are variables in a program that need to be maintained longer than a specified lifetime they may be stored in one or more of the LFs having available storage.

I claim:

1. A method of executing a sequence of instructions in an execution unit (ExU) node in an array of ExUnits, the method comprising:
    receiving a first instruction and a destination instruction having a dependency on the first instruction, wherein the first instruction identifies the destination instruction in a sequence of instructions from a program and specifies that a result generated by execution of the first instruction by a first ExU node is to be forwarded to a destination ExU node that is to execute the destination instruction;
    executing the first instruction on the first $ExU_{r,c}$ node to generate the result for delivery through an ExU network to the destination ExU node associated with the identified destination instruction, wherein according to a Row by Column (R×C) matrix, an R×C array of $ExU_{row(r),column(c)}$ nodes are interconnected by the ExU network, the ExU network comprising (K+1) by (K+1) array of $ExU_{r,c}$ nodes, a first stage (K+1)×(K+1) array of $R_{r,c}$ nodes for a first direction of communication, a second stage (K+1)×(K+1) array of $S_{r,c}$ nodes for a second direction of communication, and in each stage having wiring configured according to a 1 to K+1 adjacency of connections between nodes which includes wrapping around data paths at the edges of the (K+1)×(K+1) arrays, K is an odd integer, K>1, R≥(K+1), C≥(K+1), r∈{0,1, ..., K}, and c∈{0,1, ..., K}, and wherein connections exist between each $ExU_{r,c}$ node and $R_{r,c}$ nodes with the same row number in the first direction of communication, the first $ExU_{r,c}$ node generates the result for a selectable first data path that connects to an $R_{r,c+1}$ node and for a selectable second data path that connects to an $R_{r,c-1}$ node for single step adjacency and for a selectable third data path that connects to an $R_{r,c+2}$ node for two step adjacency, and for a selectable fourth data path that connects to an $R_{r,c}$ node in the same r,c position in the R×C matrix as the connecting $ExU_{r,c}$ node, and wherein connections exist between each $R_{r,c}$ node and $S_{r,c}$ nodes with the same column number in the second direction of communication, wherein an $R_{r,c}$ node, associated with a selected path in the first direction of communication, produces the result for a selectable first data path that connects to an $S_{r+1,c}$ node and for a second data path that connects to an $S_{r-1,c}$ node for single step adjacency and for a third data path that connects to an $S_{r+2,c}$ node for two step adjacency, and for a fourth data path that connects to an $S_{r,c}$ node in the same r,c position in the R×C matrix as the connecting $R_{r,c}$ node, wherein an $S_{r,c}$ node, associated with the selected data path in the second direction of communication, produces the result on a destination data path that connects to the destination ExU node to be received at the destination ExU node; and
    executing the destination instruction in the destination ExU node based on the received result to produce a destination result for use by the program.

2. The method of claim 1, wherein the $R_{r,c}$ nodes are 4×4 crossbars having four inputs and four outputs and the $S_{r,c}$ nodes are 4×1 multiplexers having four inputs and one output.

3. The method of claim 1 further comprising:
    wrapping around when $R_{r,c}+1=R_{r,K+1}$ in the first direction of communication to $R_{r,0}$ for single step adjacency;
    wrapping around when $R_{r,c-1}=R_{r,-1}$ in the first direction of communication to $R_{r,K}$ for single step adjacency; and
    wrapping around when $R_{r,c+2}=R_{r,K+2}$ in the first direction of communication to $R_{r,1}$ for two step adjacency.

4. The method of claim 1 further comprising:
    wrapping around when $S_{r+1,c}=S_{K+1,c}$ in the second direction of communication to $S_{0,c}$ for single step adjacency;
    wrapping around when $S_{r-1,c}=S_{-1,c}$ in the second direction of communication to $S_{K,c}$ for single step adjacency; and
    wrapping around when $S_{r+2,c}=S_{K+2,c}$ in the second direction of communication to $R_{1,c}$ for two step adjacency.

5. The method of claim 1 further comprising:
    executing a second instruction on a second $ExU_{r,c}$ node to generate a second result for a selectable fifth data path that connects to the $R_{r,c}$ node, associated with the selected path in the first direction of communication;

producing the second result on the $R_{r,c}$ node, associated with the selected path in the first direction of communication, for a selectable fifth data path that connects to the $S_{r,c}$ node, in the same r,c position in the R×C matrix as the connecting $R_{r,c}$ node; and producing the second result, by the $S_{r,c}$ node associated with the selected data path in the second direction of communication, on a second destination data path that connects to the destination ExU node to be received at the destination ExU node.

6. The method of claim 5, wherein the $R_{r,c}$ nodes are 4×5 crossbars having four inputs and five outputs and the $S_{r,c}$ nodes are 5×2 multiplexers having five inputs and two outputs.

7. The method of claim 1 further comprising:
setting a program counter mode control to master mode: and
controlling the instruction sequence from the program for operation of the K+1 rows of the R×C array of $ExU_{row(r),column(c)}$ nodes by using the program counter for row 0 and making program counters for rows 1 to row K to be in a not used state.

8. The method of claim 1 further comprising:
setting a program counter mode control to not master mode; and
controlling the instruction sequence from the program for each row of the R×C array of $ExU_{row(r),column(c)}$ nodes using K+1 program counters for separate control of rows 0 to row K to be in an active state.

9. A network organized according to a 1 by Column (1×C) matrix, the network comprising:
a 1×C array of $ExU_{1,column(c)}$ nodes interconnected by an ExU network, the ExU network comprising 1 by (K+1) array of $ExU_{1,c}$ nodes connected to a 1×(K+1) array of $R_{1,c}$ nodes for a first direction of communication, and having wiring configured according to a 1 to K+1 adjacency of connections between the $ExU_{1,c}$ nodes and the $R_{1,c}$ nodes which includes wrapping around data paths at the edges of the 1×(K+1) arrays, K is an odd integer, K>1, C≥(K+1), and c∈{0,1, ..., K} and wherein connections exist between each $ExU_{1,c}$ node and $R_{1,c}$ nodes in the first direction of communication, a first $ExU_{1,c}$ node is connected by a first data path to an $R_{1,c+1}$ node and by a second data path to an $R_{1,c-1}$ node for single step adjacency and by a third data path to an $R_{1,c+2}$ node for two step adjacency, and by a fourth data path to an $R_{1,c}$ node in the same 1,c position in the 1×C matrix as the first $ExU_{1,c}$ node, wherein the $R_{1,c-1}$ node is connected by a first outputA path to its associated $ExU_{1,c-1}$ node, the $R_{1,c}$ node is connected by a second outputA path to its associated $ExU_{1,c}$ node, the $R_{1,c+1}$ node is connected by a third outputA path to its associated $ExU_{1,c+1}$ node, and the $R_{1,c+2}$ node is connected by a fourth outputA path to its associated $ExU_{1,c+2}$ node.

10. The network of claim 9, wherein the $R_{r,c}$ nodes comprise:
4×1 multiplexers, in the $R_{r,c}$ nodes, having four inputs and one output.

11. The network of claim 9, wherein the node is connected by a first outputB path to its associated $ExU_{1,c-1}$ node, the $R_{1,c}$ node is connected by a second outputB path to its associated $ExU_{1,c}$ node, the $R_{1,c+1}$ node is connected by a third outputB path to its associated $ExU_{1,c+1}$ node, and the $R_{1,c+2}$ node is connected by a fourth outputB path to its associated $ExU_{1,c+2}$ node.

12. The network of claim 11, wherein the $R_{r,c}$ nodes comprise:
4×2 crossbars, in the $R_{r,c}$ nodes, having four inputs and two outputs.

13. The network of claim 9 further comprising:
the first data path is wrapped around when $R_{1,c+1}=R_{1,K+1}$ in the first direction of communication to $R_{r,0}$ for single step adjacency;
the second data path is wrapped around when $R_{1,c-1}=R_{1,K-1}$ in the first direction of communication to $R_{r,K}$ for single step adjacency; and
the third data path is wrapped around when $R_{1,c+2}=R_{1,K+2}$ in the first direction of communication to $R_{r,1}$ for two step adjacency.

14. The network of claim 9 further comprising:
connecting two 1×C arrays of $ExU_{1,column(c)}$ nodes by a second stage (K+1)×(K+1) array of $S_{r,c}$ nodes for a second direction of communication, wherein each $R_{r,c}$ node is connected by a selectable first data path to an $S_{r+1,c}$ node and by a second data path to an $S_{r-1,c}$ node for single step adjacency and by a third data path to an $S_{r+2,c}$ node for two step adjacency, and by a fourth data path to an $S_{r,c}$ node in the same r,c position in the R×C matrix as the connecting $R_{r,c}$ node, wherein each $S_{r,c}$ node is connected by a destination data path to a corresponding destination $ExU_{r,c}$ node.

15. The network of claim 14, wherein the $R_{r,c}$ nodes and $S_{r,c}$ nodes comprise:
4×2 multiplexers in the $R_{r,c}$ nodes having four inputs and one output; and
2×1 multiplexers in the $S_{r,c}$ nodes having two inputs and one output.

16. A system apparatus comprising:
a load unit having a source of data values external to an array of execution unit (ExU) nodes that are interconnected by an ExU network;
a first multiplexing element in the load unit to connect externally received data values to an ExU located in the ExU network for processing by one or more program instructions;
a store unit having a source of data values internal to the array of ExU nodes;
a second multiplexing element in the store unit to connect to the ExU network to receive data values from an ExU source and connect the internally received data values to a destination node located external to the ExU network for processing by the destination node, wherein the load unit is combined with the store unit as a single node of the array of ExU nodes and wherein the ExU network comprises:
an Row×Column (R×C) array of $ExU_{row(r),column(c)}$ nodes interconnected by the ExU network, the ExU network comprising (K+1) by (K+1) array of $ExU_{r,c}$ nodes, a first stage of (K+1)×(K+1) array of $R_{r,c}$ nodes for a first direction of communication, a second stage of (K+1)× (K+1) array of $S_{r,c}$ nodes for a second direction of communication, and in each stage having wiring configured according to a 1 to K+1 adjacency of connections between nodes which includes wrapping around data paths at the edges of the (K+1)×(K+1) arrays, K is an odd integer, K>1, R≥(K+1), C≥(K+1), r∈{0, 1, ..., K}, and c∈{0,1, ..., K}, and wherein connections exist between each $ExU_{r,c}$ node and $R_{r,c}$ nodes with the same row number in the first direction of communication, and wherein connections exist between each $R_{r,c}$ node and $S_{r,c}$ nodes with the same column number in the second direction of communication, and wherein each $S_{r,c}$ node is connected to corresponding $ExU_{r,c}$ nodes.

17. The system apparatus of claim 16, wherein the source of data values comprises:
a memory unit having a read port providing the source of data values.

18. The system apparatus of claim 16 wherein the destination node comprises:
a memory unit having a write port to receive the data values from the ExU source and store the received data values in the memory.

19. The system apparatus of claim 16, wherein the load unit connects to the ExU network as an $ExU_{r,c}$ node connects in the first direction of communication to an $R_{r,c}$ node to send a load supplied value to the ExU network and the store unit connects to the ExU network as an $ExU_{r,c}$ node to receive an ExU network provided value from an $S_{r,c}$ node output.

20. The system apparatus of claim 16 further comprises:
each $R_{r,c}$ node is configured with a 4×5 crossbar, each $R_{r,c}$ node having four inputs and five outputs; and
each $S_{r,c}$ node is configured as a 5×2 multiplexer node having two outputs, wherein each $R_{r,c}$ node is connected to a corresponding $S_{r,c}$ node and each $S_{r,c}$ node is connected to a corresponding $ExU_{r,c}$ node, and further wherein two of the five outputs of each $R_{r,c}$ node are connected to the corresponding $S_{r,c}$ node having the same r,c position as the connected $R_{r,c}$ node and the two outputs of each $S_{r,c}$ node are connected to the corresponding $ExU_{r,c}$ node having the same r,c position as the connected $S_{r,c}$ node, whereby parallel operations are provided through the ExU network.

* * * * *